Feb. 25, 1964  R. J. SHALLBETTER ETAL  3,122,123
ROTATIONAL AND TRANSLATIONAL DRIVE
Filed Jan. 5, 1962  3 Sheets-Sheet 1
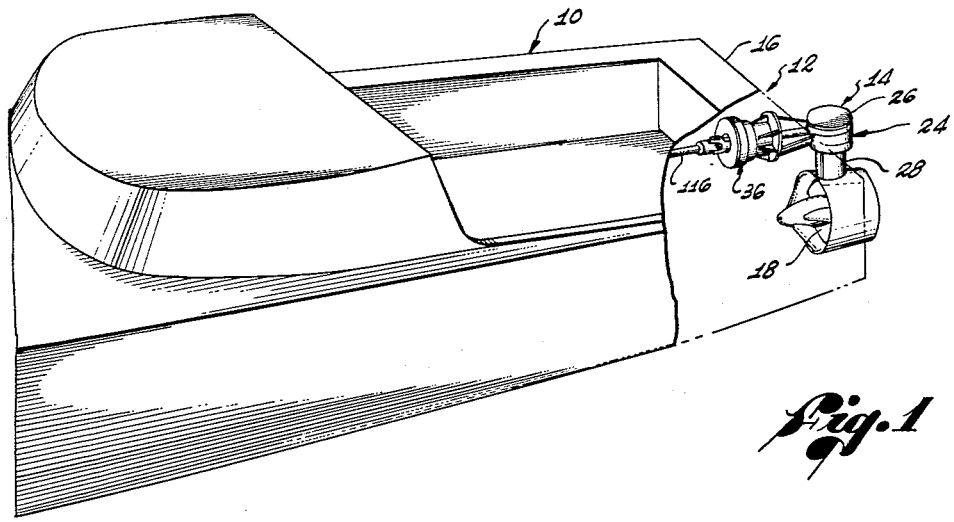
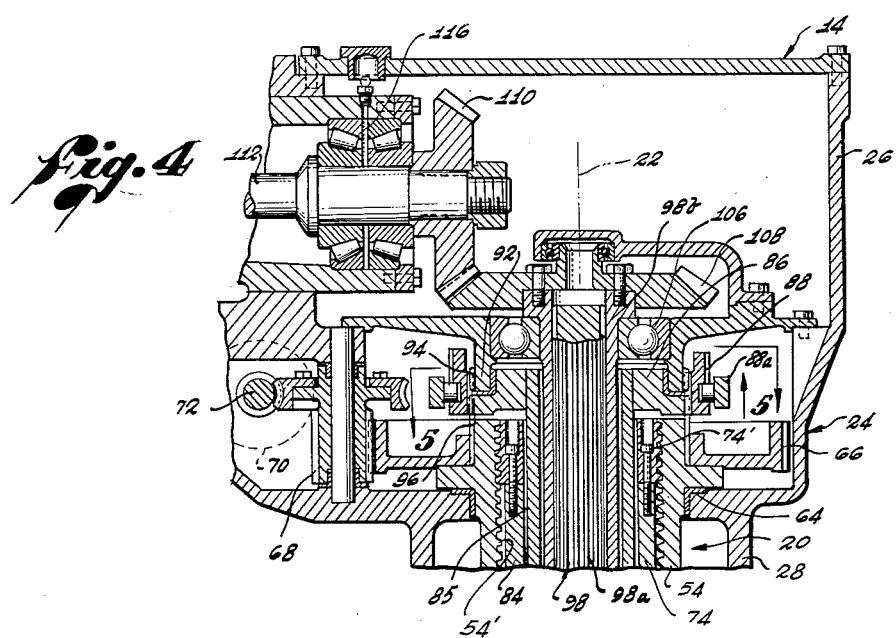
INVENTORS
RAYMOND J. SHALLBETTER
CONRAD V. IVERSON
BY
Lilly & Nyhagen
ATTORNEYS

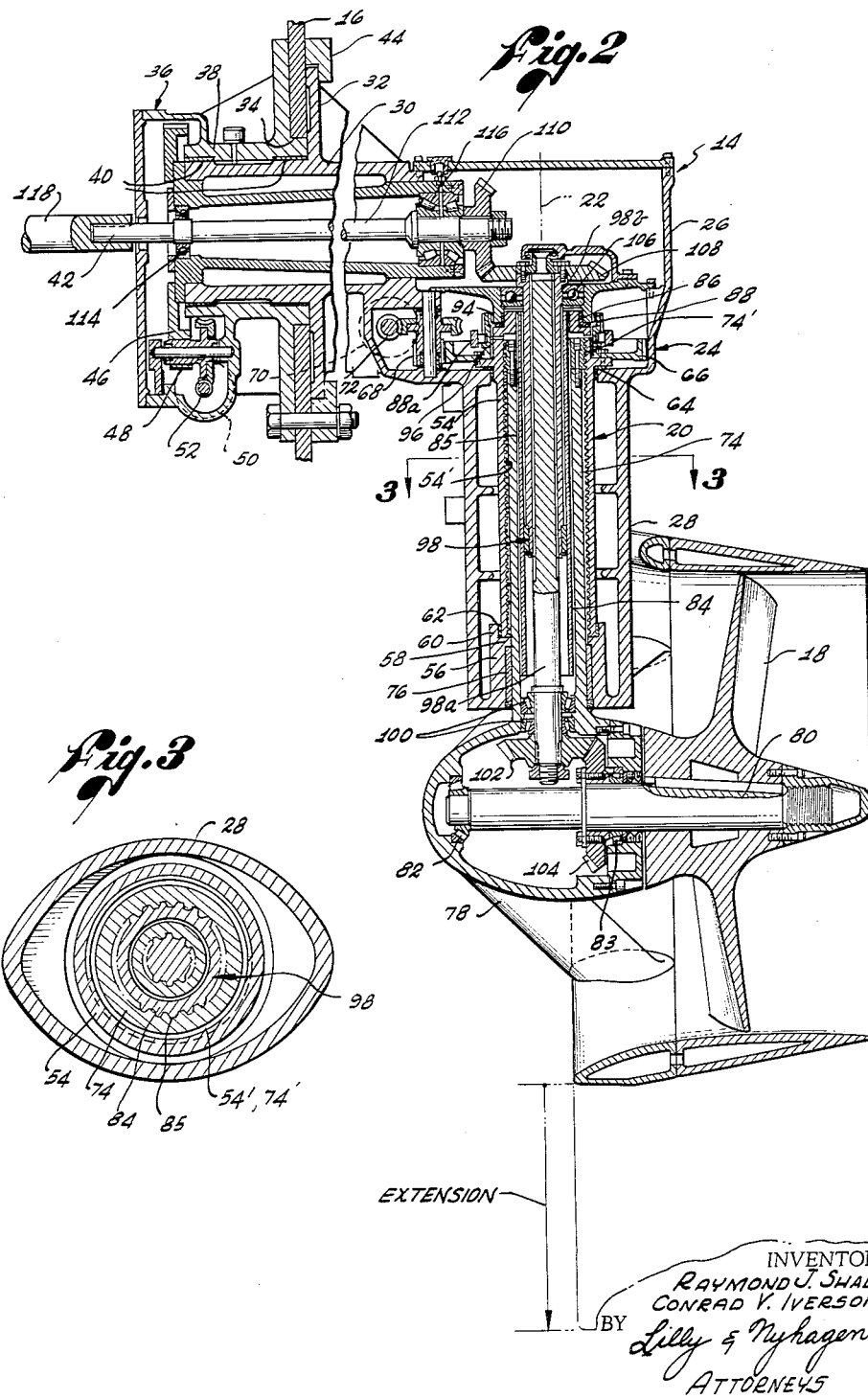

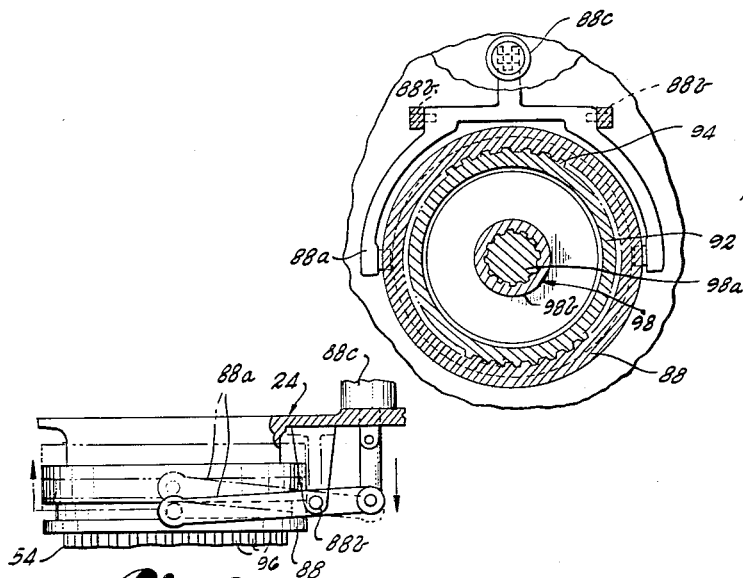
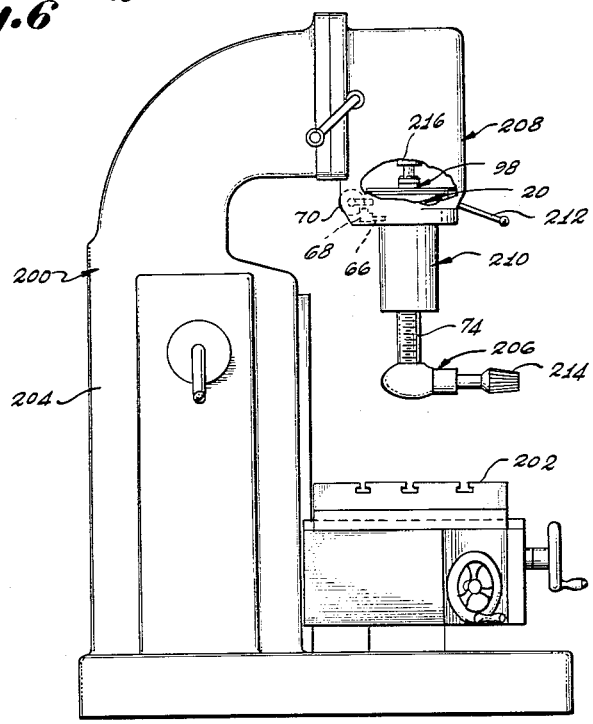

3,122,123
ROTATIONAL AND TRANSLATIONAL DRIVE
Raymond J. Shallbetter, Garden Grove, and Conrad V. Iverson, Lynwood, Calif., assignors to Western Gear Corporation, Lynwood, Calif., a corporation of Washington
Filed Jan. 5, 1962, Ser. No. 164,464
10 Claims. (Cl. 115—41)

This invention relates generally to mechanical drives and, particularly, to a mechanical drive for moving and/or positioning a member in rotation about an axis and in translation along the axis.

The mechanical drive of this invention is adapted to use in any machine or device requiring movement and/or positioning of a driven member in rotation about an axis and in translation along the axis. Since all of the possible applications of the present drive cannot be disclosed, two applications have been selected for presentation as typical applications of the drive. It should be understood, of course, that these two illustrative applications are not intended to be limitative of the invention.

The first illustrative application comprises a so-called "Z" drive marine propulsion system in which the present drive is utilized to raise and lower the propeller for varying the propeller depth in the water and to turn the propeller on a vertical axis for steering purposes. The second illustrative application comprises a milling machine in which the present drive is utilized to feed and index the work head of the machine.

Accordingly, it is a general object of the invention to provide a new and improved mechanical drive for moving and/or positioning a driven member in rotation about an axis and in translation along the axis.

A more specific object of the invention is to provide a mechanical drive of the character described in which both the rotational motion and the translational motion of the driven member are derived from a common power source.

Another object of the invention is to provide a mechanical drive of the character described which is locked against translational motion of the driven member when the latter is being moved or positioned in rotation and which is locked against rotational motion of the driven member when the latter is being moved or positioned in translation along the axis.

Other objects, advantages, and features of the invention will become readily apparent as the description proceeds.

Briefly, the objects of the invention are attained by providing a mechanical drive equipped with a supporting frame on which is rotatably mounted a first internally threaded tubular member. Extending through and threadedly engaged with this member is a second externally threaded tubular member. A third member extends through and is keyed against rotation with respect to the second member. A clutch means is provided for selectively locking the third member against rotation with respect to the frame or with respect to the first member and a motor is provided for driving the first member in either direction of rotation. The second member of the drive forms the driven member.

In operation, when the clutch means is positioned to lock the third member against rotation with respect to the frame, the second member is thereby also locked against rotation with respect to the frame. Under these conditions, when the first member is driven in rotation by its motor, the threaded engagement between the first member and second member causes the latter member to move in one axial direction or the other depending upon the direction of rotation of the first member. When the clutch means is positioned to lock the third member against rotation with respect to the first member, the second, driven member also rotates with the first member so that rotation of the latter by its motor drives the driven member in rotation.

In the illustrated marine propulsion application of the present drive, the several members of the drive are normally vertically disposed and the second or driven member carries the propeller. In one position of the clutch means, then, the propeller is raised and lowered by the motor of the drive and in the other position of the clutch means, the propeller is rotated on a vertical axis by the motor for steering purposes. In this case, a drive shaft, including two telescopically engaged sections, extends through the third member of the drive for driving the propeller in rotation.

In the milling machine application, the drive is again normally vertically disposed and the second or driven member carries the work head. In one position of the drive clutch, then, the work head is raised and lowered and in the other position of the clutch, the work head is rotated.

A better understanding of the invention may be had from the following detailed description thereof, taken in connection with the annexed drawings, wherein:

FIG. 1 is a perspective view of a boat having a so-called "Z" drive propulsion system embodying the present drive;

FIG. 2 is an enlarged vertical section through the actual propulsion unit in FIG. 1 illustrating the present drive embodied therein;

FIG. 3 is an enlarged section taken along line 3—3 in FIG. 2;

FIG. 4 is an enlargement of the upper end of the propulsion unit in FIG. 2;

FIG. 5 is a section taken along line 5—5 in FIG. 4 illustrating the clutch of the present drive;

FIG. 6 is a side elevation of the clutch in FIG. 5; and

FIG. 7 illustrates a milling machine embodying the present drive.

In FIG. 1 of these drawings, the numeral 10 denotes a boat equipped with a so-called "Z" drive marine propulsion system 12. This propulsion system includes a propulsion unit 14 which is mounted on the rear transom 16 of the boat 10 and carries the propeller 18 of the propulsion system. Incorporated in the propulsion unit 14 is the present mechanical drive 20 (FIG. 2). The present drive 20 is utilized to raise and lower the propeller 18, to vary the depth of the latter in the water, and to rotate the propeller on the normally vertical axis 22 for steering the boat 10.

In the illustrated marine propulsion system, the supporting frame structure for the drive 20 is furnished by the housing 24 of the propulsion unit 14. This housing includes a normally upper portion 26 and a lower, generally tubular portion 28 extending from the upper portion 26 and substantially coaxial with the axis 22. Extending from the upper portion 26 of the housing 24, at right angles to the axis 22, is a tubular extension 30 having an intermediate, external flange 32.

Tubular extension 30 extends through an opening 34 in the transom 16 of the boat 10. Bolted to the inner side of the transom 16 is a supporting housing 36 having a generally cylindrical portion 38 which receives the tubular extension 30. The tubular extension 30 is rotatably supported in the supporting housing 36 by means of bearings 40 for rotation of the drive unit housing 24 on the longitudinal axis 42 of the boat 10. The tubular extension 30 is restrained against axial movement from the supporting housing 36 by means of a flanged ring 44 which is bolted to the outer side of the transom 16 and slidably engages the extension flange 32, as shown.

Fixed to the end of the extension 30, within the supporting housing 36, is a gear 46. This gear meshes with a pinion 48 which is rotatably supported on the housing 36 and is driven in rotation from a motor 50 through worm gearing 52. Motor 50, therefore, is operative to rotate the propulsion unit 14 on the axis 42 between its normal position of FIG. 2, wherein the tubular portion 28 of the propulsion unit housing 24 extends downwardly in a vertical position, and an inverted, retracted position (not shown) in which the tubular portion 28 and the propeller 18 carried thereon are raised out of the water.

Proceeding now to the present mechanical drive 20, the latter will be seen to comprise (FIGS. 2–5) a first internally threaded tubular member, or acme thread nut, 54 which is generally coaxially positioned within the tubular portion 28 of the propulsion unit housing 24. Within the lower end of the tubular housing portion 28 is an integral cylindrical element 56 having a shoulder 58 in a plane normal to the axis 22 on which the lower end of the tubular member 54 rests and which forms a thrust bearing for the tubular member to restrain the latter against axial movement in one direction in the tubular housing portion 28. The cylindrical element 56 of the tubular housing portion 28 also includes a cylindrical flange 60 which encircles the lower end of the tubular member 54. A bearing 62 rotatably supports the lower end of the tubular member 54 in the cylindrical flange 60.

The upper end of the tubular member 54 extends into the upper portion 26 of the propulsion unit housing 24 and is rotatably supported on the housing by a bearing 64.

Fixed to the upper end of the tubular member 54, within the upper portion 26 of the housing 24, is a gear 66. This gear meshes with a pinion 68 which is rotatably supported on the housing 24 and is driven in rotation from a reversible motor 70 through worm gearing 72. Thus, the tubular member, or acme thread nut, 54 can be driven in either direction of rotation by operation of the motor 70.

Extending axially through the tubular member 54 is a second externally threaded tubular member, or propeller pod mast, 74. This latter member forms the driven member of the present drive 20. The external threads 74' on this second member, which are located only at the upper end of the member, engage the internal threads 54' on the first tubular member 54. The lower end of the second tubular member 74 extends through the cylindrical element 56 of the tubular housing portion 28 and below the lower end of the latter portion. A sleeve bearing 76 in the cylindrical element 56 rotatably and slidably supports the lower end of the second tubular member 74 in the housing portion 28.

Mounted on the lower end of the second tubular member 74, exteriorly of the tubular housing portion 28, is a propeller pod 78. Propeller 18 is fixed to a shaft 80 which extends into and is rotatably supported in the propeller pod 78 by combined thrust and journal bearings 82 and 83 for rotation of the propeller 18 on an axis at right angles to the axis 22.

Extending slidably through the second tubular member 74 is a third tubular member, or steering driver, 84. This third tubular member in externally splined to the second tubular member 74, as shown at 85, so that the latter member can move axially with respect to the third tubular member 84 but is prevented from rotation with respect to the latter member.

Fixed to the upper end of the third tubular member 84 is an externally splined clutch collar 86. Slidable on and splined to this clutch collar is a clutch member 88. Encircling a hub 90 on the clutch collar 86 is a cylindrical flange 92 on the propulsion unit housing 24. This flange has external splines 94 which interengage with the internal splines on the clutch member 88 when the latter is shifted to its upper position of FIG. 4. When the clutch member 88 is in this latter position, it remains in splined engagement with the clutch collar 86 so that the third tubular member, or splined steering driver, 84 is restrained against rotation with respect to the propulsion unit housing 24.

Externally formed on the upper end of the first tubular member, or acme thread nut, 54 are splines 96 which interengage with the internal splines on the clutch member 88 when the latter is shifted to its lower position of FIG. 2 to lock the first tubular member 54 and third tubular member 84 against relative rotation.

From this description, it is evident that when the clutch member 88 is shifted to its upper clutching position of FIG. 4, wherein the third tubular member 84 is locked against rotation with respect to the propulsion unit housing 24, the second tubular member 74, which is splined to the third member, is also locked against rotation with respect to the housing 24 but is free to move in the axial direction. When the first tubular member 54 is driven in rotation by its motor 70 with the clutch member 88 in its upper clutching position, then, the second tubular member 74 is driven up or down along the axis 22 depending upon the direction of rotation of the first member 54. When the clutch member 88 is shifted to its lower clutching position of FIG. 2, the third tubular member 84 and, therefore, the second tubular member 74 which is splined to the third member are locked against rotation with respect to the first tubular member 54. When the first member 54 is driven in rotation by its motor 70 with the clutch member 88 set in its lower clutching position, then, the second tubular member 74 is driven in rotation with the first member.

Accordingly, the single motor 70 can be used either to drive the second member 74 in rotation on the axis 22 by setting the clutch member 88 in its lower clutching position or in translation along the axis 22 by setting the clutch member 88 an its upper clutching position. In the illustrated propulsion system, of course, rotation of the second tubular member, or propeller pod mast, 74 by the motor 70 rotates the propeller pod 78 and the propeller 18 carried thereon about the axis 22. Similarly, axial movement of the second tubular member, or propeller pod mast, 74, by the motor 70 moves the propeller pod 78 and the propeller 18 thereon along the axis 22. Thus, the motor 70 can be used for both rotating the propeller pod 78 on the axis 22 to effect a steering action and driving the propeller pod 78 up or down along the axis 22 to vary the depth of the propeller 18 in the water. Clutch member 88 is shifted between its upper and lower positions by a clutch operating fork 88a which engages in an external groove in the clutch member. This fork is pivoted at 88b (FIGS. 5 and 6) to the housing 24 and is rocked on its pivot axis, to shift the clutch member 88, by a solenoid actuator 88c. Obviously this solenoid actuator and the motor 70 of the drive 20 may be controlled from the remote control station of the boat.

Extending axially through the third tubular member 84 is a drive shaft 98 for the propeller 18. This drive shaft comprises two splined, telescopic sections 98a and 98b. The lower end of the lower shaft section 98a is rotatably supported in the lower end of the second tubular member or propeller pod mast 74 and is restrained against axial movement in the latter member by thrust and journal bearings 100. Fixed on the lower end of the lower shaft section, within the propeller pod 78, is a bevel gear 102 which meshes with a bevel gear 104 fixed to the propeller shaft 80. Rotation of the shaft 98, therefore, drives the propeller 18 in rotation.

The upper end of the upper shaft section 98b is rotatably supported in the propulsion unit housing 24, and is restrained against axial movement with respect to the housing, by a bearing 106. Fixed on the upper end of the upper shaft section 98b is a bevel gear 108 which meshes with a bevel gear 110 on the end of a second drive shaft 112. This latter shaft is rotatably supported in the extension 30 of the housing 24 by means of bearings 114 and 116 and is driven in rotation, to drive the propeller 18, from an engine (not shown) on the boat 10 through a main drive shaft 118.

Reference is now made to FIG. 7. In this figure, numeral 200 denotes a milling machine having a worktable 202, an upright supporting frame or column 204, and a work head 206 which is carried by a means 208 mounted on the upper end of the column 204 and including the present drive 20. In this case, the drive 20 is contained within a housing 210 which is attached to the supporting column 204. The work head 206 is carried on the lower end of the driven member 74 of the drive 20. The motor 70 of the drive 20 is mounted on the housing 210. In the milling machine application under consideration, the clutch member 88 (not shown in FIG. 7) of the drive is operated by a handle 212.

In operation, then, the driven member 74 of the drive 20, and the work head 206 carried thereon, may be raised and lowered by the motor 70 by operating the clutch handle 212 to shift the clutch member (not shown) to its upper clutching position. Similarly, the driven member 74 and the work head 206 may be rotated by the motor 70 by operating the clutch handle 212 to shift the clutch member 88 to its lower clutching position. The rotational motion of the work head 206 may be used to index the head, for example, and the vertical motion of the work head may be used for feeding the rotary cutting bit 214, carried by the work head, with respect to the work. This cutting bit is driven in rotation from a motor 216 within the upper end of the housing 210 through the telescopic drive shaft 98 of the drive 20.

Clearly, then, the invention herein described and illustrated is fully capable of attaining the objects and advantages preliminarily set forth.

While certain illustrative embodiments of the invention have been disclosed, numerous modifications in the design, arrangement of parts, and instrumentalities of the invention are possible within the spirit and scope of the following claims.

What is claimed is:

1. A mechanical drive comprising:
   a frame,
   a first internally threaded tubular member rotatably mounted on and restrained against axial movement with respect to said frame,
   a second externally threaded tubular member within and threadedly engaged with said first member,
   a third member slidable in and keyed against rotation with respect to said second member,
   means for rotating said first member in either direction, and
   means for selectively locking said third member against rotation with respect to said frame or against rotation with respect to said first member.

2. A mechanical drive comprising:
   a frame,
   a first internally threaded tubular member rotatably mounted on and restrained against axial movement with respect to said frame,
   a second externally threaded tubular member within and threadedly engaged with said first member,
   a third member slidable in and keyed against rotation with respect to said second member,
   means for rotating said first member in either direction of rotation, and
   means for selectively locking said third member against rotation with respect to said frame or against rotation with respect to said first member including a clutch member slidably keyed on said third member for axial movement on the latter member between a first clutching position and a second clutching position, cooperating clutch teeth on said clutch member and frame which engage to lock said third member against rotation with respect to said frame upon movement of said clutch member to said first position, and cooperating clutch teeth on said clutch member and said first member which engage to lock said third member against rotation with respect to said first member upon movement of said clutch member to said second position.

3. A mechanical drive comprising:
   a frame,
   a first internally threaded tubular member rotatably mounted on and restrained against axial movement with respect to said frame,
   a second externally threaded tubular member within and threadedly engaged with said first member,
   a third member slidable in and keyed against rotation with respect to said second member,
   means for rotating said first member in either direction of rotation,
   means for selectively locking said third member against rotation with respect to said frame or against rotation with respect to said first member including a clutch member slidably keyed on said third member for axial movement on the latter between a first clutching position and a second clutching position, cooperating clutch teeth on said clutch member and frame which engage to lock said third member against rotation with respect to said frame upon movement of said clutch member to said first position, and cooperating clutch teeth on said clutch member and said first member which engage to lock said third member against rotation with respect to said first member upon movement of said clutch member to said second position, and
   remotely controllable actuating means for selectively shifting said clutch member to said positions.

4. A mechanical drive comprising:
   a frame,
   a first internally threaded tubular member rotatably mounted on and restrained against axial movement with respect to said frame,
   a second externally threaded tubular member within and threadedly engaged with said first member,
   a third tubular member slidable in and keyed against rotation with respect to said second member,
   one end of said second member extending beyond said frame and the adjacent end of said third member,
   a rotary drive shaft extending through said third member including two slidably keyed, telescopic sections,
   means rotatably supporting one shaft section on said one end of said second member and axially restraining said one shaft section against axial movement with respect to said second member,
   means rotatably supporting the other shaft section on said frame and restraining said other shaft section against axial movement with respect to said frame,
   means for rotating said first member in either direction of rotation, and
   means for selectively locking said third member against rotation with respect to said frame or against rotation with respect to said first member.

5. A mechanical drive comprising:
   a frame,
   a first internally threaded tubular member rotatably mounted on and axially restrained against axial movement with respect to said frame,
   a second externally threaded tubular member within and threadedly engaged with said first member,
   a third tubular member slidable in and keyed against rotation with respect to said second member,
   one end of said second member extending beyond said frame and the adjacent end of said third member,
   a rotary drive shaft extending through said third member including two slidably keyed, telescopic sections,
   means rotatably supporting one shaft section on said one end of said second member and axially restraining said one shaft section against axial movement with respect to said second member, means rotatably supporting the other shaft section on said frame and restraining said other shaft section against axial movement with respect to said frame, means for rotating said first member in either direction of rotation, and means for selectively locking said third member against rotation with respect to said frame or against rotation with respect to said first member including a clutch member slidably keyed on the other end of said third member for axial movement on the latter member between a first clutching position and a second clutching position, cooperating clutch teeth on said clutch member and frame which engage to lock said third member against rotation with respect to said frame upon movement of said clutch member to said first position, and cooperating clutch teeth on said clutch member and first member which engage to lock said third member against rotation with respect to said first member upon movement of said clutch member to said second position.

6. A marine propulsion unit comprising:
a housing to be mounted on the transom of a boat including a depending, normally vertical tubular portion,
a propeller pod mast coaxially mounted on said tubular portion for rotation and axial movement with respect to said portion,
the lower end of said mast extending below the lower end of said tubular portion,
a propeller pod on the lower end of said mast,
a propeller rotatable on said pod on an axis at right angles to the mast,
a motor on said housing,
means including clutch means operable to one position to drivably couple said motor and mast for rotation of the latter by said motor and to another position to drivably couple said motor and mast for axial movement of the latter by said motor, and
means including telescopic drive shaft means extending through said mast for driving said propeller in rotation.

7. A marine propulsion unit comprising:
a housing to be mounted on the transom of a boat and including a depending, normally vertical tubular portion,
an internally threaded tubular nut coaxially rotatably mounted within and restrained against axial movement with respect to said tubular housing portion,
an externally threaded propeller pod mast extending through and threadedly engaged with said nut,
the lower end of said mast extending below the lower end of said tubular housing portion,
a propeller pod on the lower end of said mast,
a propeller rotatably mounted on said pod for turning on an axis at right angles to said mast,
a tubular steering driver extending through and slidably keyed to said mast,
means including a reversible motor for driving said nut in either direction of rotation,
means for selectively locking said steering driver against rotation with respect to said housing or against rotation with respect to said nut, and
means for driving said propeller in rotation including a rotary telescopic drive shaft extending axially through said steering driver.

8. A machine tool comprising:
a supporting frame,
a drive on said frame including a housing and a tubular member supported for rotation and axial movement on said housing,
one end of said member extending beyond the housing,
a work head mounted on said one end of said member including a rotary cutter,
a reversible motor,
means including clutch means operable to one position to drivably couple said motor and member for rotation of the latter on its central axis by said motor and to another position to drivably couple said motor and member for axial movement of the latter by said motor,
a second motor, and
means including telescopic drive shaft means extending axially through said member drivably coupling said second motor and cutter.

9. A mechanical drive comprising:
a frame;
a first rotary, axially restrained threaded member on said frame;
a second rotary, axially movable threaded member threadedly coupled to said first member;
a third member slidably keyed to said second member;
means for driving said first member in rotation; and
means for selectively locking said third member against rotation with respect to said frame to effect relative axial movement of said second member with respect to said first member or locking said third member against rotation with respect to said first member to effect rotation of said members in unison.

10. A machine tool comprising:
a frame having a worktable and a supporting structure over said table;
a member mounted on said structure over said table for rotation and axial movement toward and away from said table;
a work head on the lower end of said member;
a reversible motor on said frame; and
means including clutch means operable to one position to drivably couple said motor and member for rotation of the latter on its central axis by said motor and to another position to drivably couple said motor and member for axial movement of the latter by said motor.

References Cited in the file of this patent
UNITED STATES PATENTS

| 1,124,645 | Overton | Jan. 12, 1915 |
| 2,302,795 | Noble | Nov. 24, 1942 |
| 2,479,119 | Johnson | Aug. 16, 1949 |

FOREIGN PATENTS

| 905,822 | Germany | Mar. 8, 1954 |